United States Patent
Takahashi et al.

(10) Patent No.: US 9,648,278 B1
(45) Date of Patent: May 9, 2017

(54) COMMUNICATION SYSTEM, COMMUNICATION APPARATUS AND COMMUNICATION METHOD

(71) Applicants: Masato Takahashi, Tokyo (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP); Miku Hakamatani, Kanagawa (JP)

(72) Inventors: Masato Takahashi, Tokyo (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP); Miku Hakamatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/297,334

(22) Filed: Oct. 19, 2016

(30) Foreign Application Priority Data

Oct. 28, 2015 (JP) .................................. 2015-212270

(51) Int. Cl.
*H04N 7/14* (2006.01)
*H04N 5/232* (2006.01)
(Continued)

(52) U.S. Cl.
CPC ............. *H04N 7/147* (2013.01); *G06F 3/165* (2013.01); *H04N 5/23238* (2013.01); *H04N 7/15* (2013.01); *G06F 3/03545* (2013.01)

(58) Field of Classification Search
CPC ........................................................ H04N 7/14
(Continued)

(56) References Cited

U.S. PATENT DOCUMENTS

| 6,429,856 B1 | 8/2002 | Omura et al. | |
|---|---|---|---|
| 2008/0218582 A1* | 9/2008 | Buckler | H04N 7/15 348/14.08 |

(Continued)

FOREIGN PATENT DOCUMENTS

| JP | 2007-274463 | 10/2007 |
|---|---|---|
| JP | 5028944 | 7/2012 |

*Primary Examiner* — Olisa Anwah
(74) *Attorney, Agent, or Firm* — Cooper & Dunham LLP

(57) ABSTRACT

A communication apparatus includes: an area dividing unit that divides, of an output image which is an image that the communication apparatus has output and includes at least a shot image obtained by shooting the surroundings of another communication apparatus which communicates with the communication apparatus, a display area indicating an area where the shot image is displayed into as many unit areas as the number of people captured in the shot image; a transmission control unit that controls transmitting coordinate information which indicates, of the output image, a unit area corresponding to a position pointed by a user to the other communication apparatus; and an output control unit that, when the communication apparatus has received output information including a voice subjected to directivity control according to, of the shot image, an area corresponding to the coordinate information from the other communication apparatus, controls outputting the received output information.

7 Claims, 13 Drawing Sheets

(51) Int. Cl.
*G06F 3/16* (2006.01)
*H04N 7/15* (2006.01)
*G06F 3/0354* (2013.01)

(58) Field of Classification Search
USPC ......... 348/14.01, 14.03, 14.05, 14.07, 14.08, 348/14.12
See application file for complete search history.

(56) References Cited

U.S. PATENT DOCUMENTS

| | | | |
|---|---|---|---|
| 2011/0285808 A1* | 11/2011 | Feng | H04N 7/142 348/14.09 |
| 2012/0200658 A1* | 8/2012 | Duckworth | H04N 7/152 348/14.07 |
| 2012/0274733 A1 | 11/2012 | Yano | |
| 2014/0267576 A1* | 9/2014 | Hiller | H04N 7/152 348/14.09 |
| 2014/0376740 A1 | 12/2014 | Shigenaga et al. | |
| 2015/0054791 A1 | 2/2015 | Omura | |
| 2015/0109401 A1 | 4/2015 | Kasatani et al. | |
| 2015/0146095 A1 | 5/2015 | Yano | |
| 2016/0173823 A1* | 6/2016 | Duckworth | H04N 7/147 348/14.07 |
| 2016/0359941 A1* | 12/2016 | Kvaal | H04L 65/605 |

* cited by examiner

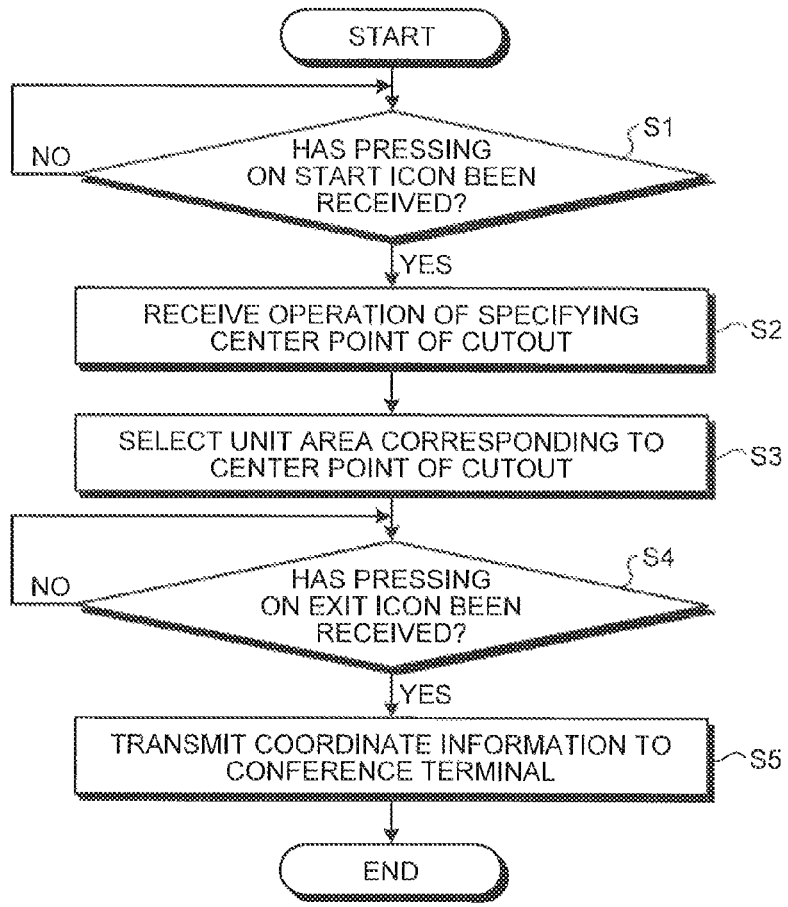
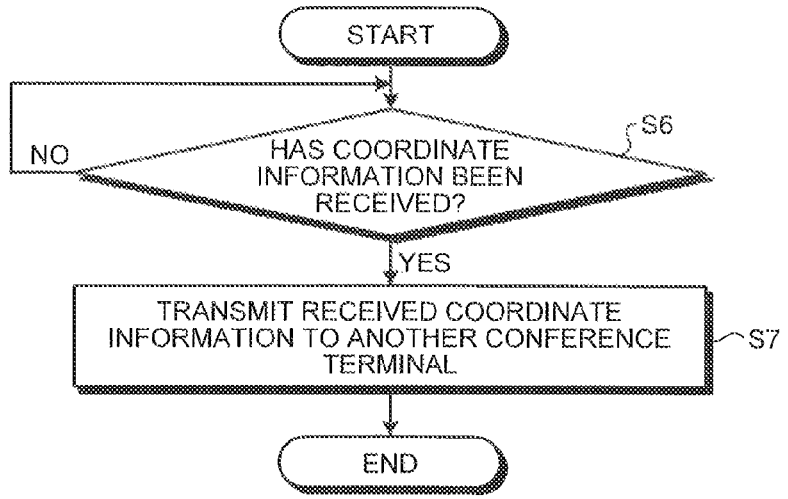

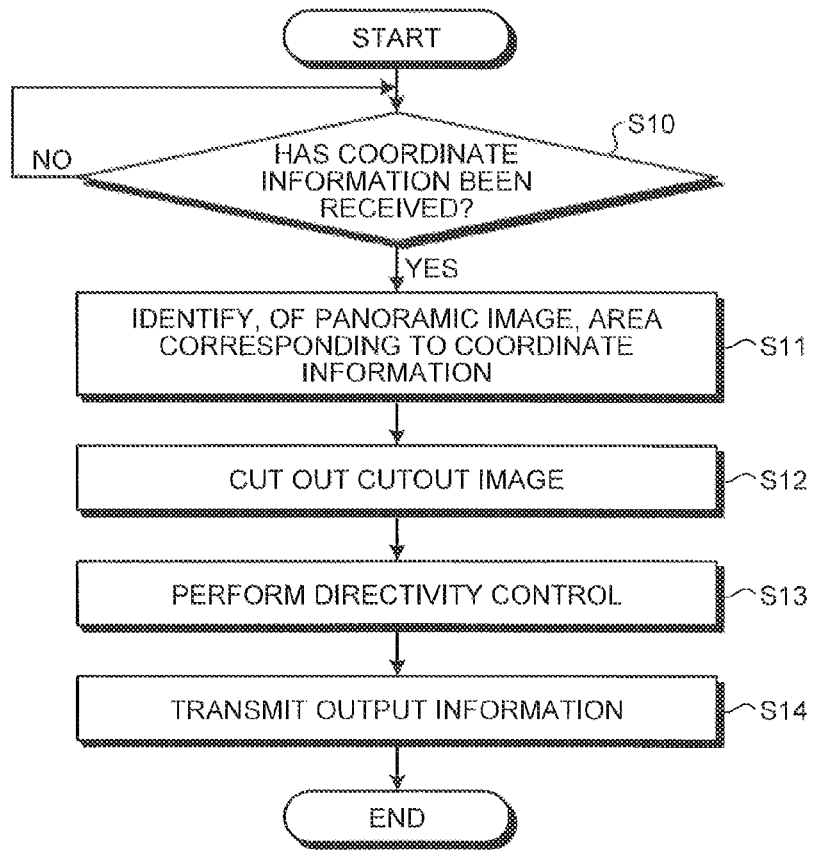
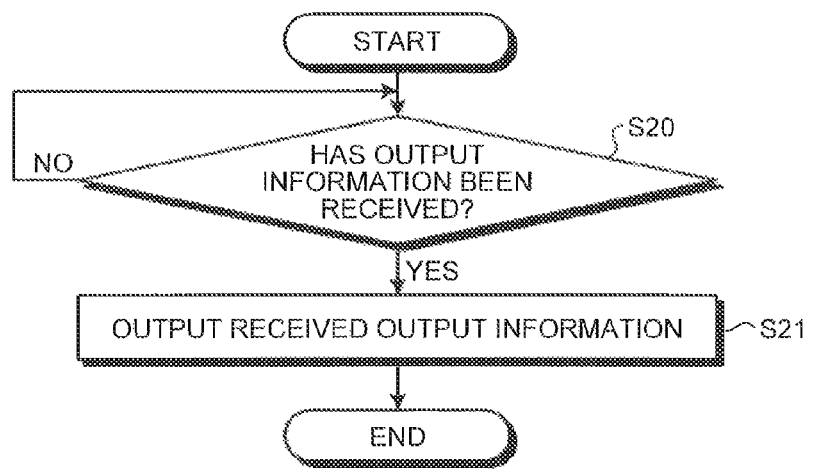

COMMUNICATION SYSTEM, COMMUNICATION APPARATUS AND COMMUNICATION METHOD

CROSS-REFERENCE TO RELATED APPLICATIONS

The present application claims priority under 35 U.S.C. §119 to Japanese Patent Application No. 2015-212270 filed Oct. 28, 2015. The contents of which are incorporated herein by reference in their entirety.

BACKGROUND OF THE INVENTION

1. Field of the Invention

The present invention relates to a communication system, a communication apparatus, and a communication method.

2. Description of the Related Art

As a form of a communication system for performing data transmission/reception among multiple communication apparatuses, there is known a video (television) conference system that realizes a remote conference by using a communication network. This video conference system can conduct a conference between remote locations almost like a face-to-face meeting in such a way that by using a communication apparatus (a terminal device) of the video conference system set up in a conference room where one of the parties participating in the remote conference, an image of the conference room such as conference participants and a voice, such as speaker's voice, are converted into digital data, and the digital data is transmitted to a communication apparatus of the other party to display the image on a display and output the voice from a speaker in a conference room of the other party.

In such a video conference system, a microphone is used to acquire conference participants' voice, and a camera is used to acquire their image. The camera has an angle of view, and therefore cannot capture an image of a conference participant who is outside the angle of view. To solve this problem, there is known a method of using a panoramic camera capable of capturing a 360-degree panoramic image. On the other hand, a general microphone is omnidirectional, and therefore picks up the ambient sound besides participant's speech. To solve this problem, there is known a method of using a microphone array to control the directivity, i.e., increase the sensitivity of a microphone that picks up the sound from a particular direction, thereby suppressing the ambient sound from being picked up and enabling participant's speech to be heard clearly. For example, Japanese Unexamined Patent Application Publication No. 2007-274463 has disclosed a method of how a conference terminal forms a beam of sound picked up by a microphone array according to a selected placement pattern of participants. Furthermore, Japanese Patent No. 5028944 has disclosed a technology to detect the direction of a speaker by use of a microphone array composed of an array of a plurality of microphones and make the shooting direction of a camera follow the detected direction.

There can be considered a method of realizing a more realistic video conference with a combination of a panoramic camera and a microphone array, namely, by shooting a whole conference room with the panoramic camera and, if there is a speaker, setting the sound pickup area of a microphone toward at least the speaker. However, this combination can set the sound pickup area of a microphone toward a speaker, though a communication apparatus of the other party may not want output focused on the speaker. Therefore, there is a problem that this combination does not enable an output intended by each communication apparatus composing a communication system.

In view of the above, there is a need to provide a communication system, a communication apparatus, and a communication method that enable one's intended output.

SUMMARY OF THE INVENTION

According to exemplary embodiments of the present invention, there is provided a communication system comprising a first communication apparatus and a second communication apparatus that transmits/receives data to/from the first communication apparatus, wherein the first communication apparatus includes: an area dividing unit that divides, of an output image which is an image that the first communication apparatus has output and includes at least a shot image obtained by shooting the surroundings of the second communication apparatus, a display area indicating an area where the shot image is displayed into as many unit areas as the number of people captured in the shot image; a first transmission control unit that performs control of transmitting coordinate information which indicates, of the output image, a unit area corresponding to a position pointed by a user to the second communication apparatus; and an output control unit that, when the first communication apparatus has received output information including a voice subjected to directivity control according to, of the shot image, an area corresponding to the coordinate information from the second communication apparatus, performs control of outputting the received output information, and the second communication apparatus includes: an acquiring unit that acquires the shot image; an identifying unit that, when the second communication apparatus has received the coordinate information from the first communication apparatus, identifies, of the shot image acquired by the acquiring unit, an area corresponding to the received coordinate information based on correspondence information indicating a correspondence relationship between the coordinates of the output image and the coordinates of the shot image; a directivity control unit that controls the directivity of a microphone array including a plurality of microphones to increase the sensitivity of, of the microphones installed in the second communication apparatus, a microphone corresponding to the area identified by the identifying unit; and a second transmission control unit that performs control of transmitting output information including at least a voice subjected to directivity control by the directivity control unit to the first communication apparatus.

Exemplary embodiments of the present invention also provide a communication apparatus comprising: an area dividing unit that divides, of an output image which is an image that the communication apparatus has output and includes at least a shot image obtained by shooting the surroundings of another communication apparatus which communicates with the communication apparatus, a display area indicating an area where the shot image is displayed into as many unit areas as the number of people captured in the shot image; a transmission control unit that performs control of transmitting coordinate information which indicates, of the output image, a unit area corresponding to a position pointed by a user to the other communication apparatus; and an output control unit that, when the communication apparatus has received output information including a voice subjected to directivity control according to, of the shot image, an area corresponding to the coordinate information from the other communication apparatus, performs control of outputting the received output information.

Exemplary embodiments of the present invention also provide a communication method for a communication system including a first communication apparatus and a second communication apparatus that transmits/receives data to/from the first communication apparatus, the communication method comprising: dividing, by the first communication apparatus, of an output image which is an image that the first communication apparatus has output and includes at least a shot image obtained by shooting the surroundings of the second communication apparatus, a display area indicating an area where the shot image is displayed into as many unit areas as the number of people captured in the shot image; performing, by the first communication apparatus, control of transmitting coordinate information which indicates, of the output image, a unit area corresponding to a position pointed by a user to the second communication apparatus; when having received output information including a voice subjected to directivity control according to, of the shot image, an area corresponding to the coordinate information from the second communication apparatus, performing, by the first communication apparatus, control of outputting the received output information; acquiring, by the second communication apparatus, the shot image; when having received the coordinate information from the first communication apparatus, identifying, by the second communication apparatus, of the shot image acquired at the acquiring, an area corresponding to the received coordinate information on the basis of correspondence information indicating a correspondence relationship between the coordinates of the output image and the coordinates of the shot image; controlling, by the second communication apparatus, the directivity of a microphone array including a plurality of microphones to increase the sensitivity of, of the microphones installed in the second communication apparatus, a microphone corresponding to the area identified at the identifying; and performing, by the second communication apparatus, control of transmitting output information including at least a voice subjected to directivity control at the controlling to the first communication apparatus.

Exemplary embodiments of the present invention also provide a communication method for a communication apparatus, the communication method comprising: dividing, of an output image which is an image that the communication apparatus has output and includes at least a shot image obtained by shooting the surroundings of another communication apparatus which communicates with the communication apparatus, a display area indicating an area where the shot image is displayed into as many unit areas as the number of people captured in the shot image; performing control of transmitting coordinate information which indicates, of the output image, a unit area corresponding to a position pointed by a user to the other communication apparatus; and when the communication apparatus has received output information including a voice subjected to directivity control according to, of the shot image, an area corresponding to the coordinate information from the other communication apparatus, performing control of outputting the received output information.

BRIEF DESCRIPTION OF THE DRAWINGS

FIG. 12 is a flowchart showing an example of the operation of the projector;

FIG. 13 is a flowchart showing an example of the operation of the conference terminal;

FIG. 14 is a flowchart showing another example of the operation of the conference terminal;

FIG. 15 is a flowchart showing still another example of the operation of the conference terminal;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
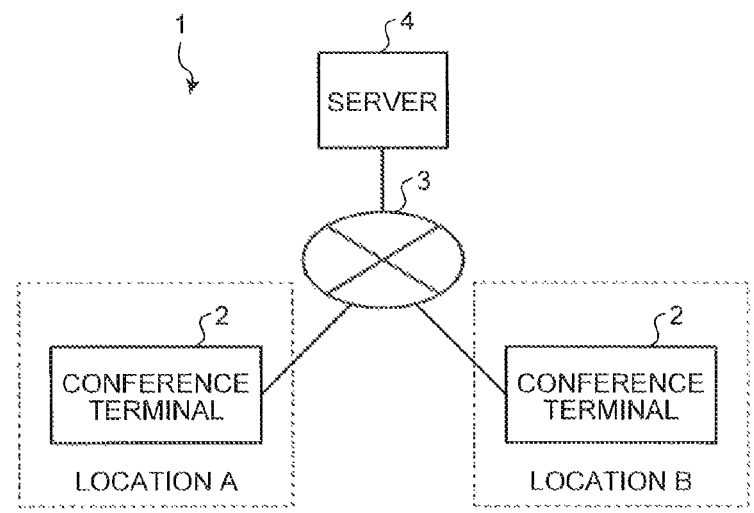
FIG. 1 is a diagram showing an example of a configuration of a communication system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An exemplary embodiment of a communication system, a communication apparatus, and a communication method according to the present invention will be described in detail below with reference to accompanying drawings.

FIG. 1 is a diagram showing an example of a configuration of a communication system 1 according to the present embodiment. In the example shown in FIG. 1, one conference terminal 2 is set up in each of Locations A and B. The conference terminals 2 set up in Locations A and B are each connected to a server 4 via a network 3 such as the Internet. Incidentally, the number of conference terminals 2 (the number of locations) included in the communication system 1 is not limited to this, and can be arbitrarily changed.

The server 4 monitors whether each conference terminal 2 is connected to the server 4, and performs control required at the time of a conference, such as control of calling the conference terminals 2 at the start of the conference. When one conference terminal 2 transmits data during the conference, the conference terminal 2 transmits image and voice data to the server 4, and the server 4 transmits the image and voice data to the other conference terminal 2 on the side of the other party. When one conference terminal 2 receives data, the conference terminal 2 receives image and voice data of the other conference terminal 2 on the side of the other party through the server 4. For example, when a conference is conducted in Locations A and B, data that a conference terminal 2 of Location A has transmitted is transmitted to a conference terminal 2 of Location B through the server 4, and is not transmitted to the other conference terminals 2 (conference terminals 2 not participating in the conference). Likewise, data that the conference terminal 2 of Location B has transmitted is transmitted to the conference terminal 2 of Location A participating in the conference through the server 4, and is not transmitted to the other conference terminals 2 not participating in the conference. By performing the control described above, a conference can be conducted among multiple conference terminals 2 (in multiple locations).

Figure 2:
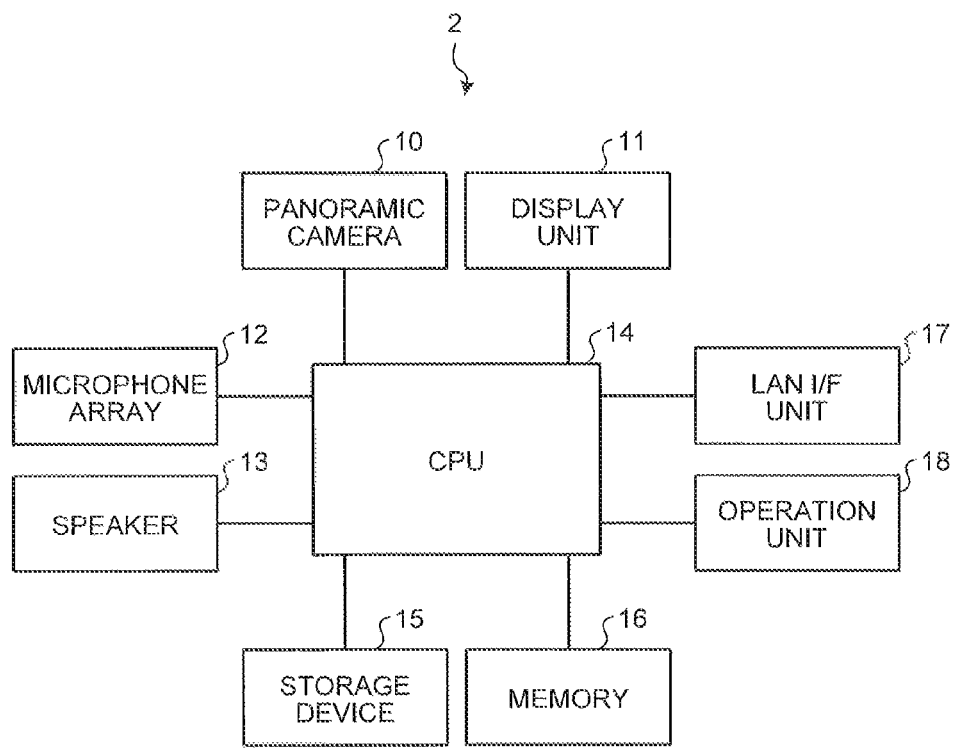
FIG. 2 is a diagram showing an example of a hardware configuration of a conference terminal.

Subsequently, a configuration of the conference terminals 2 is explained. Incidentally, the conference terminals 2 set up in Locations A and B have the same configuration; therefore, in the following description, one conference terminal 2 is cited. FIG. 2 is a diagram showing an example of a hardware configuration of a conference terminal 2. As shown in FIG. 2, the conference terminal 2 includes a panoramic camera 10, a display unit 11, a microphone array 12, a speaker 13, a CPU 14, a storage device 15, a memory 16, a LAN I/F unit 17, and an operation unit 18.

The panoramic camera 10 is an example of an "image shooting unit," and generates a shot image obtained by shooting an image. In this example, the panoramic camera 10 generates a panoramic image (an example of a shot image) obtained by shooting a 360-degree panorama around the panoramic camera 10 (which can be considered as a 360-degree panorama around the conference terminal 2), and transmits the generated panoramic image to the CPU 14. For example, the panoramic camera 10 is composed of a known omnidirectional camera or the like. By shooting a 360-degree panorama around the panoramic camera 10, a shot image in which all conference participants existing around the panoramic camera 10 are captured can be generated. The term "panoramic image" here means an image generated by combining multiple images (shot images) taken by moving one camera with a plurality of imaging sensors or by using multiple cameras with a plurality of imaging sensors. Incidentally, in this example, the area shot by the panoramic camera 10 is a 360-degree panorama around the panoramic camera 10; however, the area can be smaller than this.

The display unit 11 has a function of displaying image data received from the CPU 14 on a screen. In this example, the display unit 11 is composed of a liquid crystal display device or the like.

The microphone array 12 includes a plurality of microphones installed dispersively in the conference terminal 2, and has a function of acquiring conference participant's voice and transmitting the acquired voice to the CPU 14. The term "microphone array" is composed of a plurality of omnidirectional microphones, and forms the directivity by means of a beamformer. In general, the term "beamformer" is a technique to form the directivity by use of differences in the time for sound to reach microphones. The directivity formed by the beamformer can freely set the target direction, such as a vertical direction or a horizontal direction, according to the arrangement of microphones. Therefore, the area where the microphone array wants to pick up sound (the target area) can be arbitrarily changed.

Figure 3:
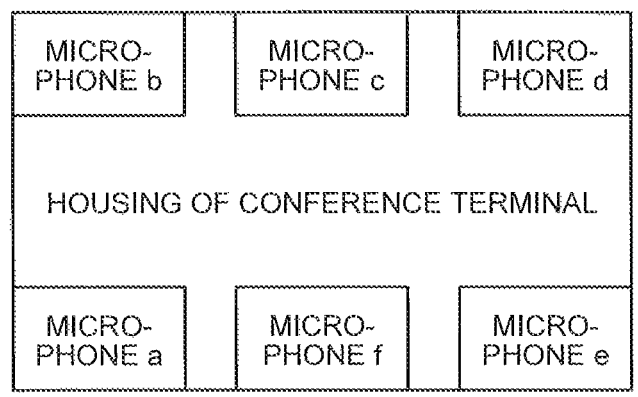
FIG. 3 is a diagram showing an example of the installation of microphones.

FIG. 3 is a diagram showing an example where six microphones a to f included in the microphone array 12 are installed in a housing of a conference terminal 2. The CPU 14 switches each microphone on/off, i.e. enables or disables each microphone and adds up respective voices picked up by the microphones, thereby can pick up a voice of an arbitrary area. The correspondence relationship between the microphones and their installation positions in the housing of the conference terminal 2 has been stored in the storage device 15 of the conference terminal 2 in advance.

Returning to the explanation of FIG. 2, the speaker 13 has a function of outputting voice data received from the CPU 14. The CPU 14 controls the operation of the entire conference terminal 2. For example, the CPU 14 has a function of controlling a video conference, a CODEC function, etc.; the CODEC function is a function of encoding an image acquired from the panoramic camera 10 and voice data acquired from the microphone array 12 and transmitting the encoded image and voice data to the LAN I/F unit 17 and also decoding image and voice data on the side of the other party of a conference that the LAN I/F unit 17 has received and transmitting the decoded image and voice data to the display unit 11 and the speaker 13. The CODEC used by the CPU 14 is, for example, H.264/AVC or H.264/SVC. The CPU 14 further has a function of controlling the directivity of the microphone array 12, a function of displaying a close-up of a speaker who is one of conference participants captured in a panoramic image acquired from the panoramic camera 10, etc.

The storage device 15 stores therein various control programs (such as a video conference control program) executed by the CPU 14, a conversion table to be described later, etc. The storage device 15 is, for example, a non-volatile storage medium such as a flash memory or an HDD.

The memory 16 is used for unfolding of a program executed by the CPU 14 and temporary storage of operation data. The memory 16 is, for example, a volatile memory such as a DDR memory. The LAN I/F unit 17 connects the conference terminal 2 to another conference terminal 2 via the network 3, and transmits/receives data (image and voice data) to/from the other conference terminal 2. The LAN I/F unit 17 is, for example, a wired LAN that is compatible with 10BASE-T, 100BASE-TX, or 1000BASE-T and is connected to an Ethernet(trademark) network or a wireless LAN compatible with 802.11a/b/g/n/ac.

The operation unit 18 is a device used in various operations (various operations related to control over devices of the conference terminal 2) made by a user, and includes, for example, a keyboard, buttons, etc.

Figure 4:
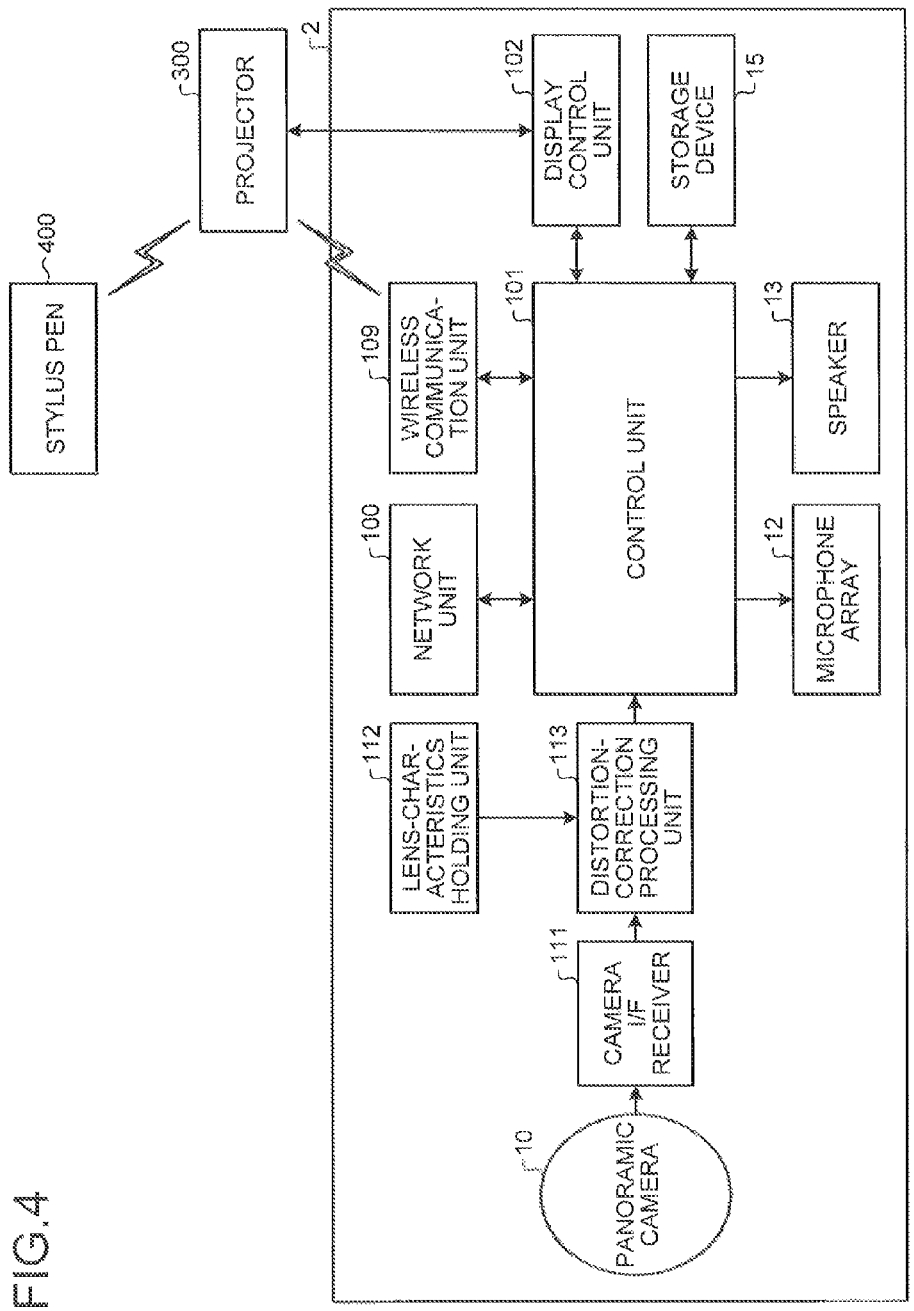
FIG. 4 is a diagram for explaining details of the conference terminal.

FIG. 4 is a diagram for explaining details of a conference terminal 2. The conference terminal 2 is connected to a projector 300 which is an example of an output device. The projector 300 has a function of projecting an image input from the conference terminal 2 on a projection plane (for example, a screen) set up in a location where the projector 300 is placed. This projector 300 enables so-called interactive manipulation, i.e., enables a user to input various operations (such as pointing, clicking, and scrolling) by directly manipulating an area of the projection plane on which the image is projected with a special wireless interactive pen (a dedicated stylus pen). A DLP interactive projector manufactured by TI Inc. has a unique pixel level tracking system embedded in a projection beam and thus is always aware of the position at which a dedicated stylus pen is pointing on the projection plane, and therefore does not require the execution of calibration at the time of start-up, and, even if the projector has been moved, does not require any calibration. In the present embodiment, the projector 300 based on this system and a dedicated stylus pen 400 are used.

The projector 300 has a function of performing wireless communication with each of the stylus pen 400 and the conference terminal 2; the stylus pen 400 has a function of performing wireless communication with the projector 300. The projector 300 performs wireless communication with the stylus pen 400, thereby can acquire information indicating the position at which the stylus pen 400 is pointing on the projection plane from the stylus pen 400, and therefore can be always aware of the position at which the stylus pen 400 is pointing (which can be considered as the position at which a user is pointing) on the projection plane. Furthermore, the conference terminal 2, also, performs wireless communication with the projector 300, thereby can be always aware of the position at which the stylus pen 400 is pointing on the projection plane.

In this example, a pair of the same projector 300 and its dedicated stylus pen 400 is set up in each of Locations A and B. Here, a conference terminal 2 and a projector 300 connected to the conference terminal 2 correspond to a "first communication apparatus" or a "second communication apparatus." Incidentally, the type of an output device connected to the conference terminal 2 is optional; for example, an interactive whiteboard can be connected to the conference terminal 2.

Furthermore, for example, a single device having both the functions of the conference terminal 2 and the functions of the projector 300 can be set up in each location. In this configuration, the single device corresponds to the "first communication apparatus" or the "second communication apparatus."

As shown in FIG. 4, the conference terminal 2 includes a network unit 100, a control unit 101, a display control unit 102, a wireless communication unit 109, a camera I/F receiver 111, a lens-characteristics holding unit 112, and a distortion-correction processing unit 113 besides the panoramic camera 10, the microphone array 12, the speaker 13, the storage device 15, etc. Respective functions of the network unit 100, the control unit 101, the display control unit 102, the wireless communication unit 109, the camera I/F receiver 111, and the distortion-correction processing unit 113 can be realized by the CPU 14 executing a program stored in the storage device 15 or the like, or at least some of these functions can be realized by a dedicated hardware circuitry (such as a semiconductor integrated circuit). Furthermore, for example, the lens-characteristics holding unit 112 can be realized by the storage device 15.

The network unit 100 transmits/receives data to/from another conference terminal 2 that is the other party of a conference.

The control unit 101 is a part that performs various controls and arithmetic operations. Functions that the control unit 101 has will be described in detail later.

The display control unit 102 has a function of controlling display (projection of an image on the projection plane) performed by the projector 300.

The wireless communication unit 109 performs wireless communication with the projector 300, and acquires position information that indicates the position at which the stylus pen 400 is pointing on the projection plane from the projector 300. The wireless communication unit 109 can notify the control unit 101 of the position information acquired from the projector 300.

A panoramic image generated by the panoramic camera 10 is sent to the camera I/F receiver 111. The camera I/F receiver 111 is assumed to be a high-speed serial I/F, such as V-by-One (trademark) or HDMI (trademark). The distortion-correction processing unit 113 corrects distortion of the panoramic image subjected to serial/parallel conversion by the camera I/F receiver 111, and outputs the corrected panoramic image to the control unit 101. The lens-characteristics holding unit 112 stores therein conversion parameters for correcting distortion according to lens characteristics, and the distortion-correction processing unit 113 can use a conversion parameter to correct distortion of a panoramic image.

Figure 5:
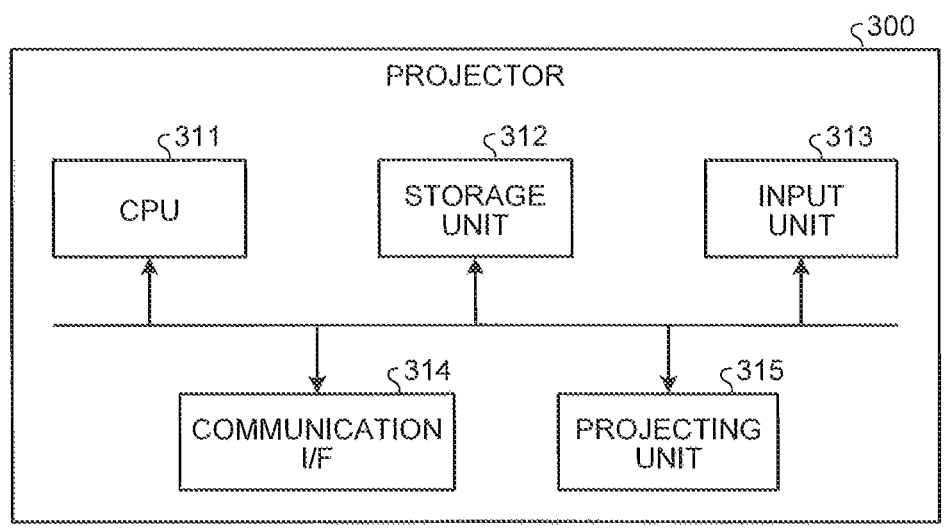
FIG. 5 is a diagram showing an example of a hardware configuration of a projector.

FIG. 5 is a schematic diagram showing an example of a hardware configuration of the projector 300. As shown in FIG. 5, the projector 300 includes a CPU 311, a storage unit 312, an input unit 313, a communication I/F 314, and a projecting unit 315; these units are connected via a bus.

The CPU 311 executes a program stored in the storage unit 312, and controls the operation of the projector 300 overall. The storage unit 312 is composed of a ROM or HDD for storing therein a program executed by the CPU 311 and data required to execute the program, a RAM that serves as a work area of the CPU 311, etc. The input unit 313 is used to perform various inputs to the projector 300, and includes a touch panel, key switches, etc. The communication I/F 314 is an interface for communicating with the stylus pen 400 and the conference terminal 2. The projecting unit 315 projects image data to be projected on the projection plane, such as a screen. The projecting unit 315 includes a projection optical system, such as a projection lens. Functions that the projector 300 has will be described later.

Figure 6:
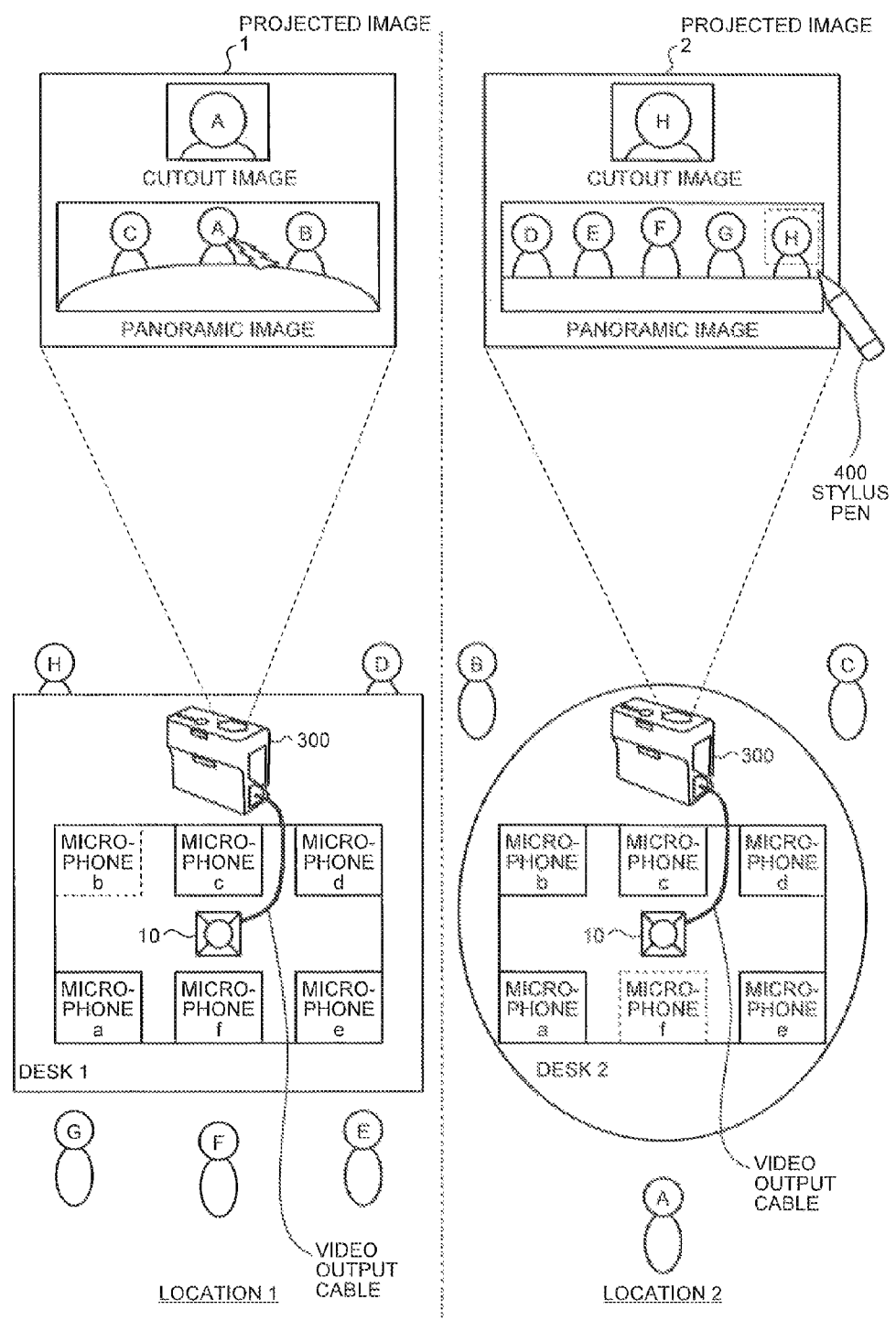
FIG. 6 is a schematic diagram showing an example of circumstances of a video conference in an embodiment of the present invention.

FIG. 6 is a schematic diagram showing an example of circumstances of a video conference in the present embodiment. In Location 1, a conference terminal 2 is put on a desk. Since the conference terminal 2 is equipped with the panoramic camera 10, the conference terminal 2 is assumed to be put on the center of the desk. As described above, this conference terminal 2 is equipped with the microphone array 12 including the microphones a to f. In Location 1, it shows that five people, Persons D to H, are participating in the video conference. Furthermore, a projector 300 is connected to the conference terminal 2 set up in Location 1 via a video output cable; an image including a panoramic image on the side of Location 2 (an image in which a panoramic image on the side of Location 2 is displayed) is projected on a projection plane in Location 1. In the following description, an image projected on the projection plane on the side of Location 1 is referred to as a "projected image 1", and an image projected on a projection plane on the side of Location 2 is referred to as a "projected image 2." When there is no need to make a distinction between projected images 1 and 2, an image projected on a projection plane is just referred to as a "projected image." A projected image here is an example of an "output image." Below the projected image 1, a panoramic image in which all people participating in the conference in Location 2 (in this example, Persons A to C) are captured is displayed. Above the projected image 1, a cutout image that is a close-up of Person A who is a speaker is displayed. In a case of a video conference system with conventional speaker tracking function, when any one of conference participants starts speaking, a close-up of the speaker is displayed in a cutout image.

Also in Location 2, a conference terminal 2 is put on a desk. Just like in Location 1, since the conference terminal 2 is equipped with the panoramic camera 10, the conference terminal 2 is assumed to be put on the center of the desk, and is equipped with the microphone array 12 including the microphones a to f. In Location 2, it is shown that three people, Persons A to C, are participating in the video conference. Just like in Location 1, a projector 300 is connected to the conference terminal 2 set up in Location 2 via a video output cable; an image including a panoramic image on the side of Location 1 (an image in which a panoramic image on the side of Location 1 is displayed) is projected on a projection plane in Location 2. Below a projected image 2, a panoramic image in which all people participating in the conference in Location 1 (in this example, Persons D to H) are captured is displayed. A speaker is normally displayed in a cutout image; however, for example, if any one of the conference participants in Location 2 has specified an area enclosed by a dotted line with the stylus pen 400 as shown in FIG. 6, a voice subjected to directivity control according to the specified area is output, and an image of the specified area is displayed as a cutout image on the projected image 2. That is, by specifying an area in which, of the conference participants captured in the panoramic image, a person whose close-up is to be displayed is captured, an output focused on the specified area can be performed. This applies to not only a person but an object; by specifying an area in which, of objects captured in a panoramic image, an object to be focused on is captured, an output focused on the specified area can be performed. A configuration of a conference terminal 2 (a function that the control unit 101 has) for realizing this will be described later.

Figure 7A:
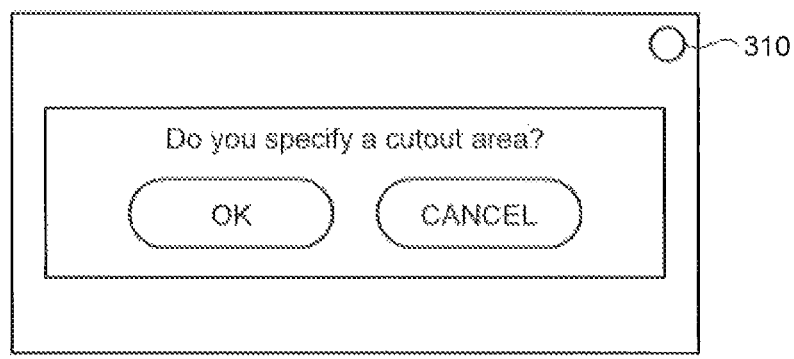
FIGS. 7A, 7B, and 7C are diagrams for explaining how to specify a cutout area of a projected image.
Figure 7B:
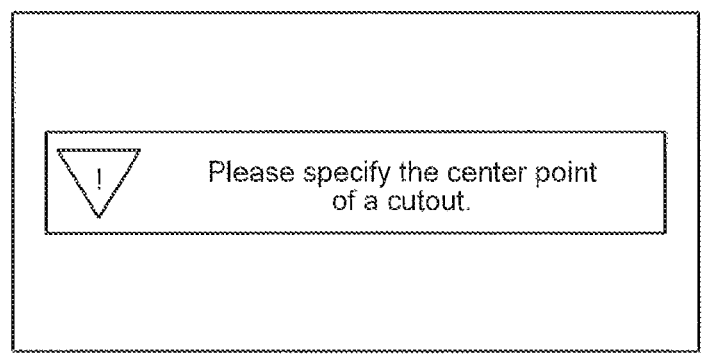
Figure 7C:
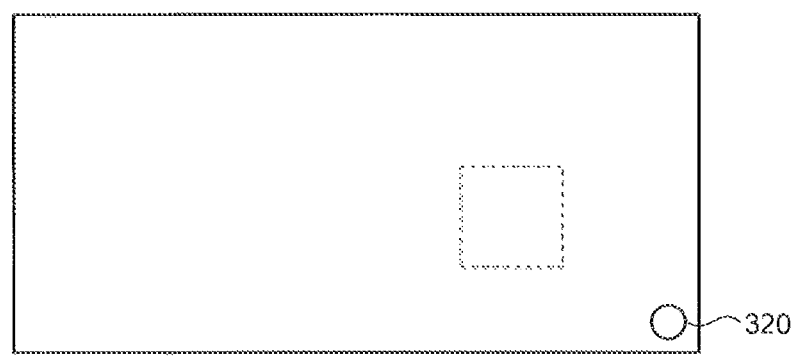

How to specify a cutout area of a projected image is explained with FIGS. 7A, 7B, and 7C. Upon receipt of pressing on a START icon 310 to instruct to start cutout-area specification, a projector 300 performs control of displaying a pop-up screen for confirmation of the start of cutout-area specification as shown in FIG. 7A (under the control of the display control unit 102). Then, upon receipt of pressing on an "OK" button on the pop-up screen, the projector 300 performs control of displaying a message prompting a user to specify the center point of a cutout as shown in FIG. 7B. After that, the user can perform an operation of specifying the center point of a cutout with the stylus pen 400 or the like.

As will be described later, in the present embodiment, of a projected image, a display area indicating an area where a panoramic image (a panoramic image on the side of the other party of a conference) is displayed is divided into as many unit areas as the number of people captured in the panoramic image; when a user has performed an operation of pointing at the center point (which is not necessarily the center point) of any one of the people captured in the display area as the center point of a cutout with the stylus pen 400 or the like, a unit area including the center point of the cutout is specified as a cutout area. This can simplify the operation of specifying, of a display area of a projected image, an area in which an object to be focused on is captured (the operation of specifying a cutout area), and therefore, it is possible to improve the user-friendliness.

Then, upon receipt of pressing on an Exit icon 320 to instruct to end the cutout-area specification as shown in FIG. 7C, the projector 300 transmits coordinate information indicating the coordinates of the specified cutout area (a rectangle enclosed by a dotted line in the example shown in FIGS. 7A, 7B, and 7C) on the projection plane to the conference terminal 2. Then, the conference terminal 2 performs control of transmitting the coordinate information received from the projector 300 to another conference terminal 2 that is the other party of the conference.

Figure 8:
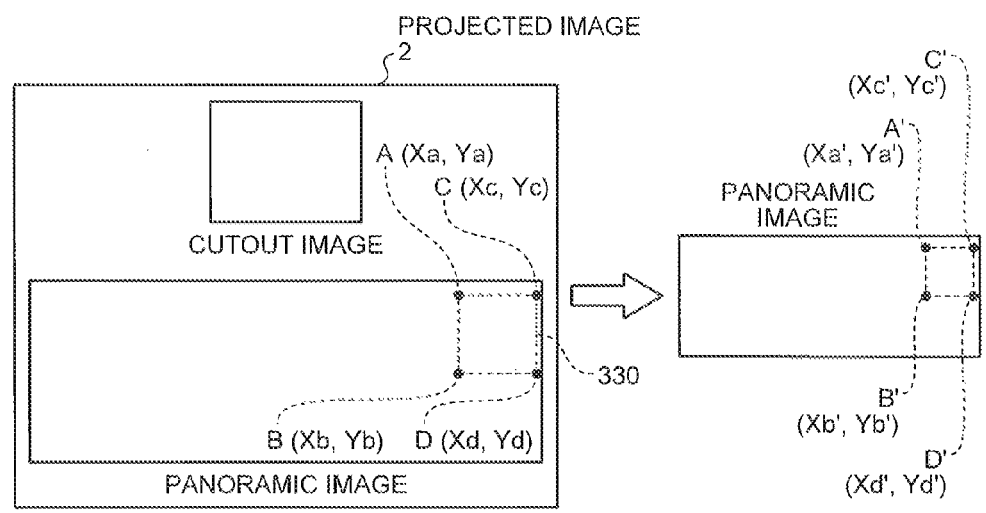
FIG. 8 is a diagram for explaining a cutout image.

Here, as shown in FIGS. 6 and 8, of the projected image 2 (which can be considered as an area of the projection plane on the side of Location 2 on which an image including the panoramic image on the side of Location 1 is projected), an area 330 in which Person H is captured is assumed to be specified as a cutout area. In this example, the area 330 is a rectangular area, and coordinate information of the area 330 is information indicating respective coordinates of four vertices (A, B, C, and D) of the area 330. In this example, the coordinates of the vertex A on the projected image 2 is (Xa, Ya), the coordinates of the vertex B is (Xb, Yb), the coordinates of the vertex C is (Xc, Yc), and the coordinates of the vertex D is (Xd, Yd). This coordinate information is transmitted to the conference terminal 2 of the Location 1 side.

The conference terminal 2 on the side of Location 1 generates output information including a cutout image which is, of the panoramic image on the side of Location 1, an area corresponding to the coordinate information received from the conference terminal 2 on the side of Location 2 and a voice subjected to directivity control according to the area, and transmits the generated output information to the conference terminal 2 on the side of Location 2. In the example shown in FIG. 8, the conference terminal 2 on the side of Location 1 cuts out, out of the panoramic image acquired from the panoramic camera 10 included in the conference terminal 2, an image of a rectangular area defined by four vertices: A' (Xa', Ya'), B' (Xb', Yb'), C' (Xc', Yc'), and D' (Xd', Yd') as a cutout image. Furthermore, the conference terminal 2 of the Location 1 side controls the directivity of the microphone array 12 to increase the sensitivity of a microphone closest to the position defined by the coordinates of the area of the panoramic image corresponding to the coordinate information received from the conference terminal 2 of the Location 2 side based on position information indicating a relationship between the positions of the microphones included in the microphone array 12 and the coordinates of the panoramic image.

Then, the conference terminal 2 of the Location 1 side transmits the output information including the cutout image cut out as described above and the voice subjected to directivity control to the conference terminal 2 of the Location 2 side. The conference terminal 2 of the Location 2 side outputs the output information received from the conference terminal 2 of the Location 1 side.

Figure 9:
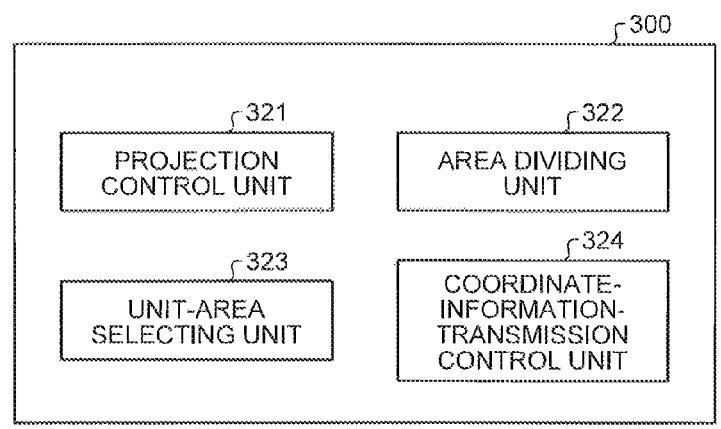
FIG. 9 is a diagram showing an example of functions that the projector has.

Detailed contents of respective functions that a projector 300 and the control unit 101 of a conference terminal 2 have are explained below. First, functions that a projector 300 has are explained. FIG. 9 is a diagram showing an example of functions that a projector 300 has. As shown in FIG. 9, the projector 300 includes a projection control unit 321, an area dividing unit 322, a unit-area selecting unit 323, and a coordinate-information-transmission control unit 324. For convenience of explanation, in FIG. 9, functions related to the present embodiment are mainly shown as an example; however, functions that the projector 300 has are not limited to these.

The projection control unit 321 performs control of projecting an image input from the conference terminal 2 on a projection plane under the control of the display control unit 102.

The area dividing unit 322 divides, of a projected image indicating an image that the the projector 300 has projected on the projection plane, a display area indicating an area where a panoramic image (a panoramic image on another conference terminal 2 that is the other party of a conference) obtained by shooting the surroundings of the other conference terminal 2 of the other party is displayed into as many unit areas as the number of people captured in the panoramic image. In the present embodiment, the area dividing unit 322 equally divides the display area into as many unit areas as the number of user's operations performed to point at people captured in the display area (which can be considered as the number of positions in the display area indicated by the user's operations), thereby can obtain a plurality of unit areas.

Figure 10:
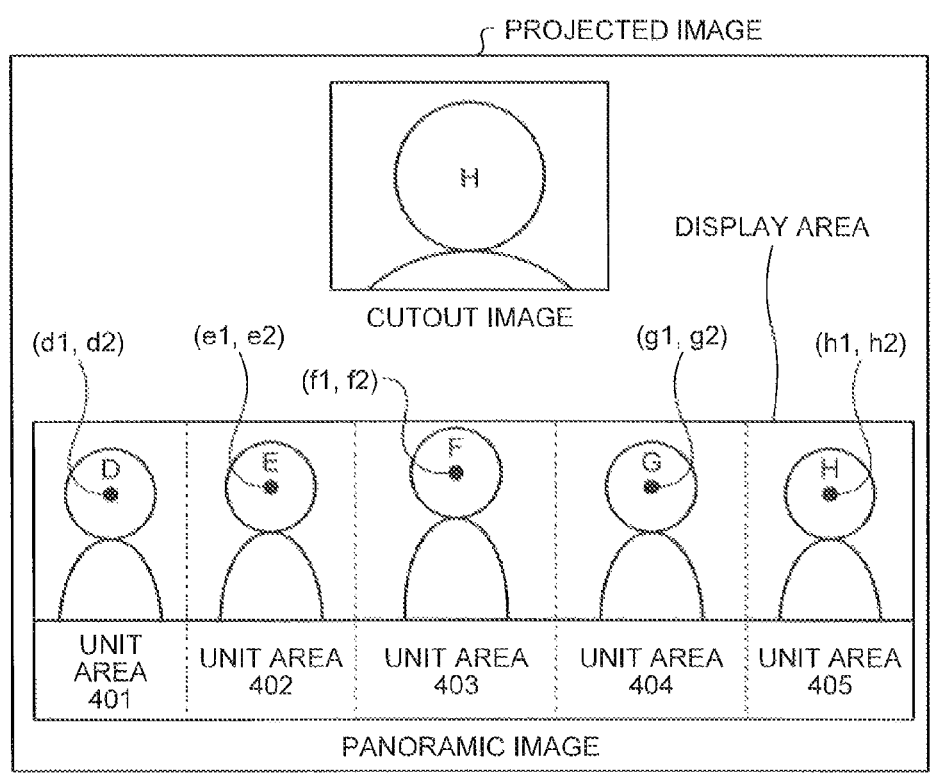
FIG. 10 is a diagram showing an example of a projected image.

For example, a projected image output by the projector 300 is assumed to be as shown in FIG. 10. In the present embodiment, when the projector 300 has received pressing on an icon for instructing to execute calibration of a correspondence relationship between the positions pointed by a user and a plurality of unit areas on a projected image as with the case of the above-described icon for specifying a cutout area, the projector 300 goes into calibration mode, and the area dividing unit 322 performs control of outputting information (which can be an image or a voice) prompting a user to point at the center point of each of people captured in the display area. In the example shown in FIG. 10, five people, Persons D, E, F, G, and H, are captured in the display area, so the user performs an operation of pointing at the center point of each of these people with the stylus pen 400 or the like. The number of pointing (the number of user's operations performed to point at people) is the total number of people captured in the display area; in this example, the number of pointing is "five." Therefore, the area dividing unit 322 equally divides the display area into five laterally (horizontally), thereby can obtain five unit areas (unit areas 401 to 405). The projector 300 exits the calibration mode when the projector 300 have obtained the unit areas.

Returning to the explanation of FIG. 9, the unit-area selecting unit 323 selects, of a projected image output by the projector 300, a unit area corresponding to the position pointed by a user. In this example, when the projector 300 has received an operation of specifying the center point of a cutout, the unit-area selecting unit 323 selects a unit area including the coordinates of the specified center point of the cutout.

The coordinate-information-transmission control unit 324 performs control of transmitting coordinate information indicating a unit area selected by the unit-area selecting unit 323 to the conference terminal 2 connected to the projector 300.

The above-described functions that the projector 300 has (the projection control unit 321, the area dividing unit 322, the unit-area selecting unit 323, and the coordinate-information-transmission control unit 324) can be realized by the CPU 311 executing a program stored in the storage unit 312 or the like, or at least some of these functions can be realized by a dedicated hardware circuitry (such as a semiconductor integrated circuit).

Figure 11:
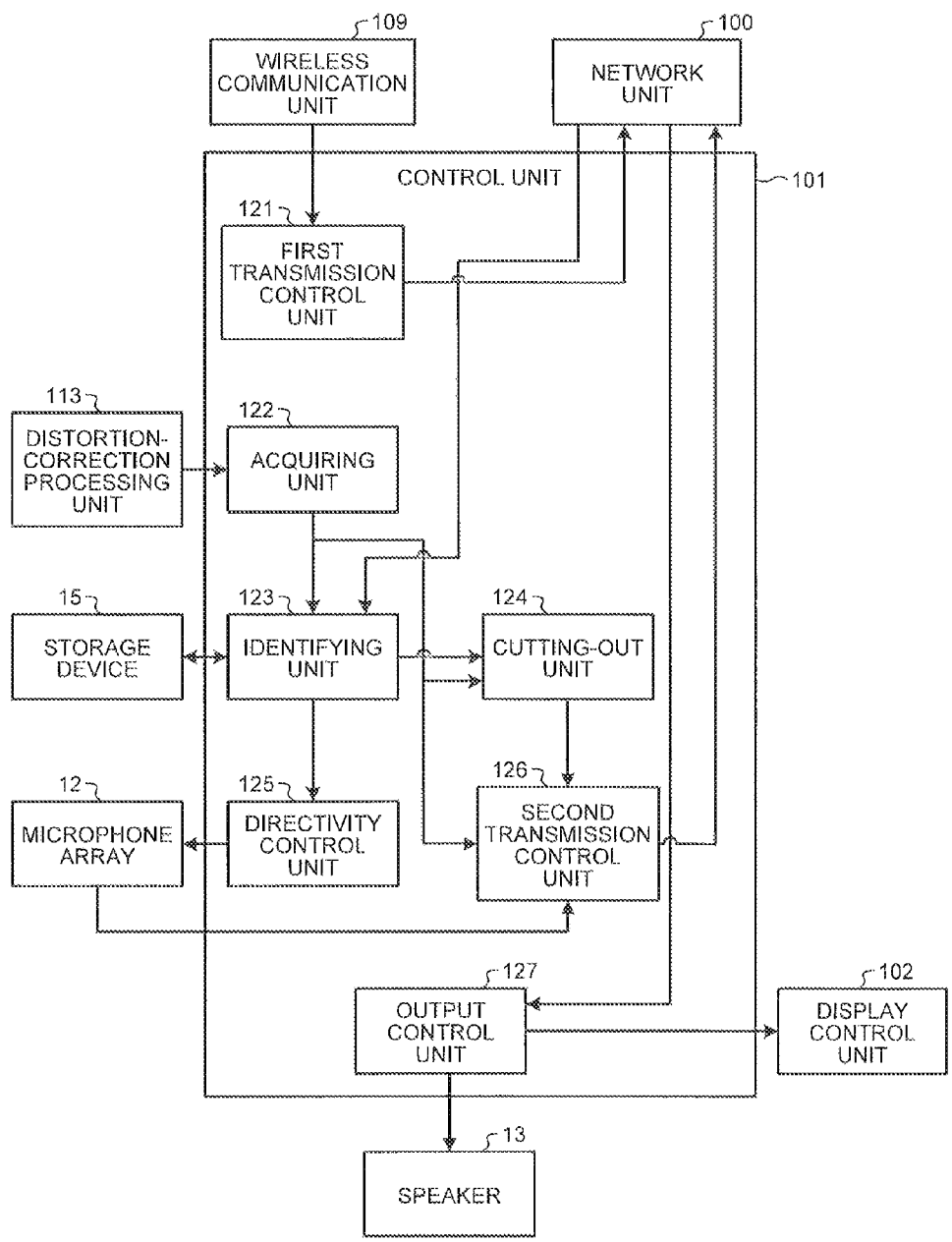
FIG. 11 is a diagram showing an example of functions that a control unit of the conference terminal has.

Subsequently, functions that the control unit 101 of a conference terminal 2 has are explained. FIG. 11 is a diagram showing an example of functions that the control unit 101 of a conference terminal 2 has. For convenience of explanation, in FIG. 11, functions related to the present embodiment are mainly shown as an example; however, functions that the control unit 101 has are not limited to these.

As shown in FIG. 11, the control unit 101 includes a first transmission control unit 121, an acquiring unit 122, an identifying unit 123, a cutting-out unit 124, a directivity control unit 125, a second transmission control unit 126, and an output control unit 127.

The first transmission control unit 121 performs, when having received coordinate information from a projector 300 connected to the conference terminal 2, control of transmitting the received coordinate information to another conference terminal 2 that is the other party of a conference. That is, the first transmission control unit 121 performs control of transmitting coordinate information indicating, of a projected image, a unit area corresponding to the position pointed by a user to another conference terminal 2 that is the other party of a conference.

The acquiring unit 122 acquires a panoramic image obtained by the panoramic camera 10 shooting the surroundings of the conference terminal 2. In this example, the acquiring unit 122 acquires a corrected panoramic image input from the distortion-correction processing unit 113.

When the conference terminal 2 has received from another conference terminal 2 coordinate information indicating, of a display area (an area where a panoramic image of the conference terminal 2 side is displayed) of a projected image that the other conference terminal 2 has output, a unit area corresponding to the position pointed by a user of the other conference terminal 2, the identifying unit 123 identifies, of a panoramic image acquired by the acquiring unit 122, an area corresponding to the received coordinate information based on correspondence information indicating a correspondence relationship between the coordinates of the projected image (which can be considered as the coordinates of an area on which an image is projected on a projection plane) and the coordinates of the panoramic image. In this example, the correspondence information has been stored in the storage device 15 in advance. Furthermore, a general video conference system enables a user to freely change the layout (change the display mode), such as to project only an image of the user's party or to project only an image of the other party; therefore, the relationship between the coordinates of a projected image and the coordinates of a panoramic image is not always in one-to-one correspondence. Accordingly, the correspondence information in this example associates the coordinates of a projected image with the coordinates of a panoramic image with respect to each display mode (layout information) of the projector 300.

The cutting-out unit 124 cuts out, of a panoramic image acquired by the acquiring unit 122, an image of an area identified by the identifying unit 123 as a cutout image.

The directivity control unit 125 controls the directivity of the microphone array 12 to increase the sensitivity of, of a plurality of microphones installed dispersively in the conference terminal 2, a microphone corresponding to an area identified by the identifying unit 123 (in this example, an area within a panoramic image). The directivity control unit 125 can determine the microphone corresponding to the coordinates of the area identified by the identifying unit 123 based on position information indicating a relationship between the positions of the microphones included in the microphone array 12 and the coordinate of the panoramic image. The position information can be stored in, for example, the storage device 15 or the like in advance.

The second transmission control unit 126 performs control of transmitting output information including at least a voice subjected to directivity control by the directivity control unit 125 to another conference terminal 2. In the present embodiment, the second transmission control unit 126 performs control of transmitting output information including a voice subjected to directivity control by the directivity control unit 125 and a cutout image cut out by the cutting-out unit 124 to another conference terminal 2. More specifically, the second transmission control unit 126 performs control of transmitting output information including a panoramic image acquired by the acquiring unit 122, a voice subjected to directivity control by the directivity control unit 125, and a cutout image cut out by the cutting-out unit 124 to another conference terminal 2. Incidentally, the output information may include at least a voice subjected to directivity control by the directivity control unit 125 (a voice subjected to directivity control according to, of a shot image acquired by the acquiring unit 122, an area corresponding to coordinate information received from another conference terminal 2). Furthermore, the control unit 101 can be configured to not include, for example, the cutting-out unit 124.

Furthermore, if the conference terminal 2 has not received coordinate information from another conference terminal 2, the second transmission control unit 126 performs control of transmitting general conference information including a panoramic image acquired by the acquiring unit 122, a cutout image that is a close-up of a speaker who is one of conference participants captured in the panoramic image, and voice data picked up by the microphone array 12 to the other conference terminal 2.

The output control unit 127 performs control of outputting an image and voice received from another conference terminal 2. The output control unit 127 performs control of instructing the display control unit 102 to cause the projector 300 to output (project) an image received from another conference terminal 2 onto a projection plane and outputting a voice received from the other conference terminal 2 from the speaker 13. When the conference terminal 2 has received output information from another conference terminal 2, the output control unit 127 in the present embodiment performs control of outputting the received output information. More specifically, the output control unit 127 performs control of instructing the display control unit 102 to output a composite image of a cutout image and a panoramic image that are included in the received output information and outputting a voice included in the received output information from the speaker 13.

Furthermore, when the conference terminal 2 has received general conference information from another conference terminal 2, the output control unit 127 performs control of outputting the received general conference information.

The above-described functions that the control unit 101 has (the first transmission control unit 121, the acquiring unit 122, the identifying unit 123, the cutting-out unit 124, the directivity control unit 125, the second transmission control unit 126, and the output control unit 127) can be realized by the CPU 14 executing a program stored in the storage device 15 or the like, or at least some of the functions that the control unit 101 has can be realized by a dedicated hardware circuitry (such as a semiconductor integrated circuit).

Furthermore, in the above example, the panoramic camera 10 and the speaker 13 are included in the conference terminal 2; however, the configuration of the conference terminals 2 is not limited to this, and, for example, the panoramic camera 10 and the speaker 13 can be provided outside of the conference terminals 2.

FIG. 12 is a flowchart showing an example of the operation of the projector 300 when a cutout area is specified. Upon receipt of pressing on the START icon 310 (YES at Step S1), the projector 300 receives an operation of specifying the center point of a cutout (Step S2). Then, the projector 300 selects a unit area corresponding to the center point of the cutout specified at Step S2 (Step S3). And then, upon receipt of pressing on the Exit icon 320 (YES at Step S4), the projector 300 transmits coordinate information indicating the unit area selected at Step S3 to the conference terminal 2 (Step S5).

FIG. 13 is a flowchart showing an example of the operation of the conference terminal 2 upon receipt of coordinate information from the projector 300 connected to the conference terminal 2. When the conference terminal 2 has received coordinate information (YES at Step S6), the first transmission control unit 121 performs control of transmitting the received coordinate information to another conference terminal 2 (Step S7).

FIG. 14 is a flowchart showing an example of the operation of the conference terminal 2 upon receipt of coordinate information from another conference terminal 2. When the conference terminal 2 has received coordinate information from another conference terminal 2 (YES at Step S10), the identifying unit 123 identifies, of a panoramic image acquired by the acquiring unit 122 (a panoramic image acquired from the panoramic camera 10 of the conference terminal 2), an area corresponding to the received coordinate information based on correspondence information (Step S11). Then, the cutting-out unit 124 cuts out, out of the panoramic image acquired by the acquiring unit 122, an image of the area identified at Step S11 as a cutout image (Step S12). Then, the directivity control unit 125 controls the directivity of the microphone array 12 to increase the sensitivity of, of a plurality of microphones installed dispersively in the conference terminal 2, a microphone corresponding to the area identified at Step S11 (Step S13). And then, the second transmission control unit 126 performs control of transmitting output information including the panoramic image acquired by the acquiring unit 122, the cutout image cut out at Step S12, and a voice subjected to directivity control obtained as a result of Step S13 to the other conference terminal 2 (Step S14).

FIG. 15 is a flowchart showing an example of the operation of the conference terminal 2 upon receipt of output information from another conference terminal 2. When the conference terminal 2 has received output information from another conference terminal 2 (YES at Step S20), the output control unit 127 performs control of outputting the received output information (Step S21).

As described above, upon receipt of coordinate information from another conference terminal 2 that is the other party of a conference, the conference terminal 2 in the present embodiment identifies, of a panoramic image acquired from the panoramic camera 10 of the conference terminal 2, an area corresponding to the received coordinate information based on correspondence information, and cuts out an image of the identified area as a cutout image. Furthermore, the conference terminal 2 controls the directivity of the microphone array 12 to increase the sensitivity of, of a plurality of microphones installed dispersively in the conference terminal 2, a microphone corresponding to the identified area. Then, the conference terminal 2 transmits output information including the cutout image and a voice subjected to the directivity control to the other conference terminal 2, and the other conference terminal 2 outputs the received output information. Accordingly, the other conference terminal 2 can perform an intended output. Incidentally, in the present embodiment, the shooting range of the panoramic camera is a 360-degree panorama. However, the essentials of the present embodiment are to specify a portion of a shot image as a cutout image and control the directivity of the microphone array to increase the sensitivity of a microphone corresponding to the cutout image. Therefore, as the shooting range, the angle of view of the camera can be below 360 degrees, and, for example, can be about 80 degrees.

The embodiment according to the present invention is explained above; however, the present invention is not limited to the embodiment as is described above, and, in the practical phase, components can be modified without departing from the scope of the invention. Furthermore, various inventions can be formed by appropriate combinations of several of the components described in the above embodiment. Moreover, for example, some of the components described in the above embodiment can be eliminated.

Figure 16:
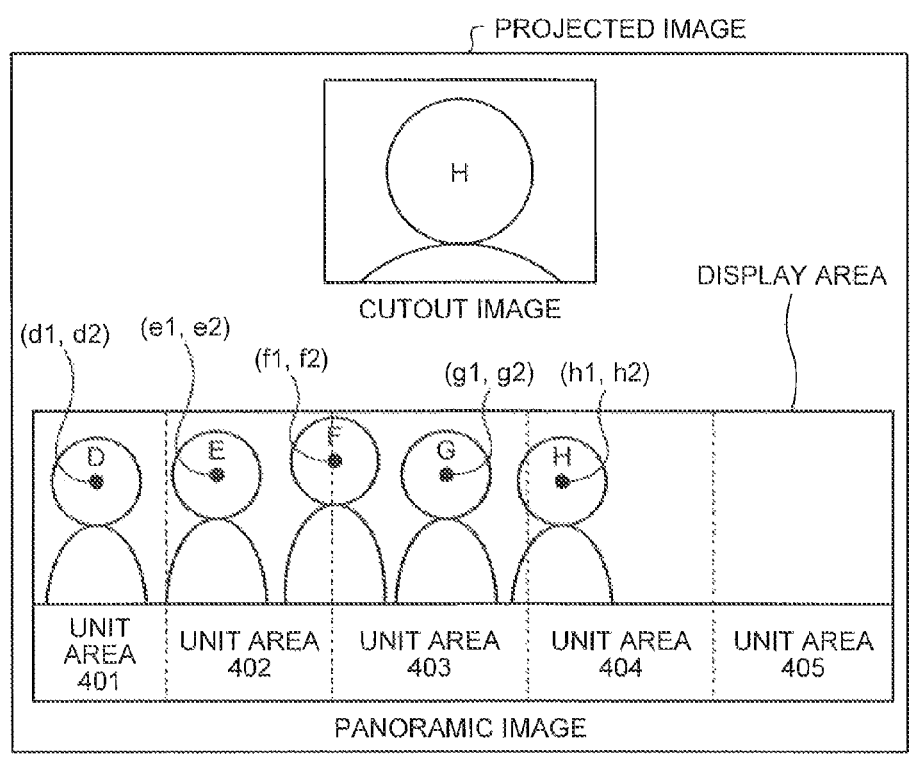
FIG. 16 is a diagram showing an example of a projected image.

In the above embodiment, the area dividing unit 322 equally divides the display area into as many unit areas as the number of user's operations performed to point at people captured in the display area, thereby obtaining a plurality of unit areas; however, for example, we assume a case where the positions of people captured in the display area are converged on one side as shown in FIG. 16. In this case, if the display area is equally divided laterally by the number of people captured in the display area, obtained unit areas do not correspond one-to-one to the people captured in the display area; therefore, it may be difficult to appropriately specify an area where a target person is captured (as a cutout area).

Accordingly, for example, the area dividing unit 322 can be configured to divide the display area into unit areas that correspond one-to-one to multiple positions in the display area indicated by user's operations on the basis of a relative positional relationship between four vertices of a projected image and the multiple positions in the display area indicated by the user's operations. Specific contents of this are explained below.

When the projector 300 has gone into the calibration mode, the area dividing unit 322 performs control of outputting information (which can be an image or a voice) prompting a user to point at four vertices of a projected image. Incidentally, for example, it an output device connected to the conference terminal 2 is an interactive whiteboard, the area dividing unit 322 does not have to perform this control because respective coordinates of four vertices of an image (an example of an output image) that the interactive whiteboard displays thereon are recognized in advance.

Then, the area dividing unit 322 performs control of outputting information prompting the user to point at the center point of each of the people captured in the display area, and detects multiple positions in the display area indicated by user's operations. By figuring out a relative positional relationship between the multiple positions in the display area indicated by the user's operations (which may be referred to as the "indicated positions" in the following description) and four vertices of the display area, the positions of cutout lines (cutout lines extending vertically) for cutting out multiple unit areas that correspond one-to-one to the indicated positions can be found.

Here we explain this focusing on one of the indicated positions. In the following description, the focused indicated position is referred to as the "focused position." First, we assume a case where there are the indicated positions adjacent to both sides of the focused position. In this case, the lateral position of a right-hand cutout line for cutting out a unit area including the focused position can be found as the position at a distance from the left side of the display area in a lateral direction of, for example, a difference between the lateral length of the display area and the distance from the right side of the display area to the lateral position of the focused position plus half the distance between the lateral position of the focused position and the lateral position of the indicated position adjacent to the right side of the focused position. Likewise, the lateral position of a left-hand cutout line for cutting out the unit area including the focused position can be found as the position at a distance from the left side of the display area in the lateral direction of, for example, the difference between the lateral length of the display area and the distance from the right side of the display area to the lateral position of the focused position minus half the distance between the lateral position of the focused position and the lateral position of the indicated position adjacent to the left side of the focused position.

Next, we assume a case where there is no indicated position adjacent to the left side of the focused position, and there is the indicated position adjacent to the right side of the focused position. In this case, the lateral position of a right-hand cutout line for cutting out a unit area including the focused position can be found in the same manner as the first case. On the other hand, the lateral position of a left-hand cutout line for cutting out the unit area including the focused position can be found as the position at a distance from the left side of the display area in the lateral direction of, for example, a difference between the lateral length of the display area and the distance from the right side of the display area to the lateral position of the focused position minus half the distance between the lateral position of the focused position and the lateral position of the indicated position adjacent to the right side of the focused position.

Furthermore, we assume a case where there is the indicated position adjacent to the left side of the focused position, and there is no indicated position adjacent to the right side of the focused position. In this case, the lateral position of a left-hand cutout line for cutting out a unit area including the focused position can be found in the same manner as the first case. On the other hand, the lateral position of a right-hand cutout line for cutting out the unit area including the focused position can be found as the position at a distance from the left side of the display area in the lateral direction of, for example, a difference between the lateral length of the display area and the distance from the right side of the display area to the lateral position of the focused position plus half the distance between the lateral position of the focused position and the lateral position of the indicated position adjacent to the left side of the focused position.

Figure 17:
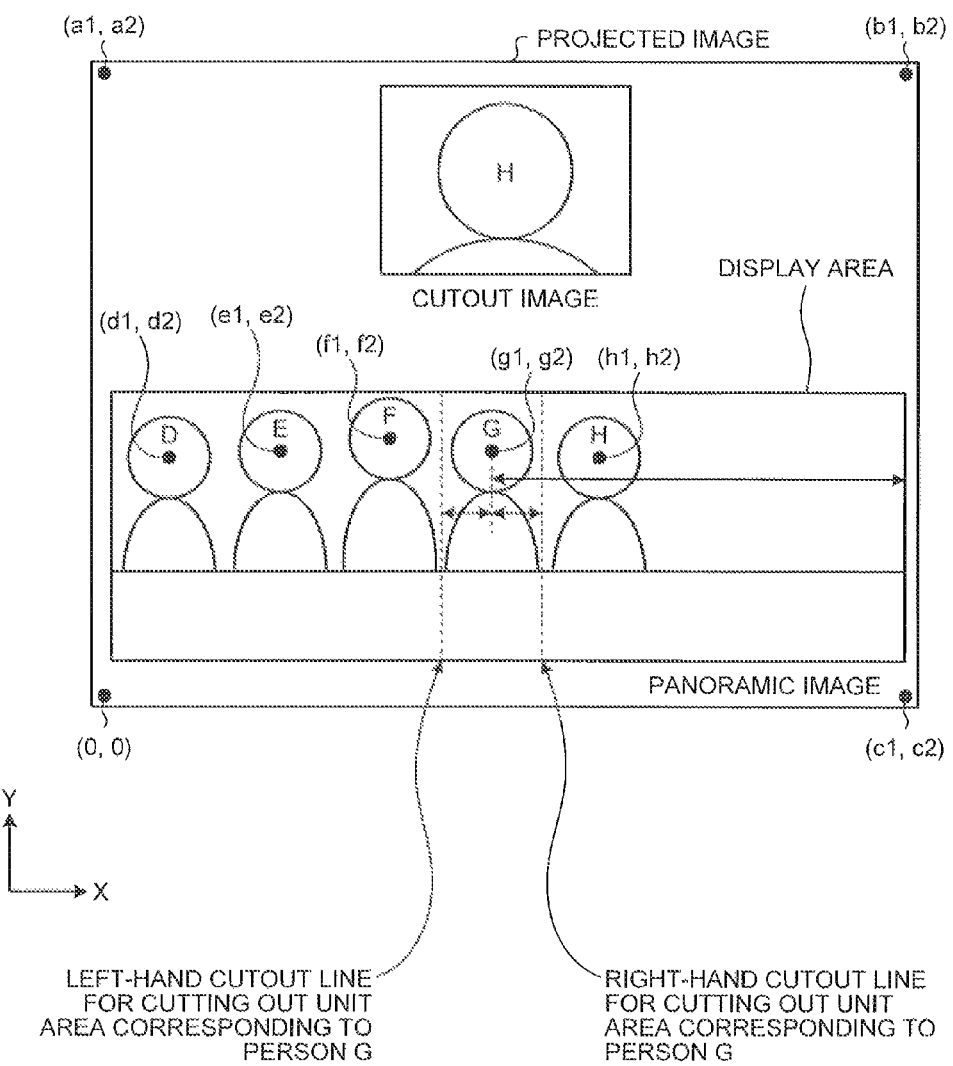
FIG. 17 is a diagram for explaining a variation of how to divide a display area.

For example, we assume a projected image shown in FIG. 17. In FIG. 17, the lateral direction is x-direction, and the vertical direction is y-direction. In the example shown in FIG. 17, the coordinates of the upper-left vertex of the projected image is ($a_1$, $a_2$), the coordinates of the upper-right vertex is ($b_1$, $b_2$), the coordinates of the lower-right vertex is ($c_1$, $c_2$), and the coordinates of the lower-left vertex is (0, 0). Furthermore, of respective coordinates of five indicated positions corresponding one-to-one to five people (Persons D to H) captured in the display area, the coordinates of the indicated position corresponding to Person D is ($d_1$, $d_2$), the coordinates of the indicated position corresponding to Person E is ($e_1$, $e_2$), the coordinates of the indicated position corresponding to Person F is (f1, f2), the coordinates of the indicated position corresponding to Person G is (g1, g2), and the coordinates of the indicated position corresponding to Person H is (h1, h2).

For example, as shown in FIG. 17, the lateral position of a right-hand cutout line for cutting out a unit area including the indicated position corresponding to Person G can be found as the position at a distance of (b1−a1)−(b1−g1)+((h1−g1)/2) from the left side of the display area in the x-direction. On the other hand, the lateral position of a left-hand cutout line for cutting out the unit area including the indicated position corresponding to Person G can be found as the position at a distance of (b1−a1)−(b1−g1)−((g1−f1)/2) from the left side of the display area in the x-direction.

Furthermore, the following is how to find cutout lines for cutting out a unit area including the indicated position corresponding to Person H that has the adjacent indicated position on the left thereof and has no adjacent indicated position on the right thereof. The lateral position of a right-hand cutout line for cutting out the unit area including the indicated position corresponding to Person H can be found as the position at a distance of (b1−a1)−(b1−h1)+((h1−g1)/2) from the left side of the display area in the x-direction. On the other hand, the lateral position of a left-hand cutout line for cutting out the unit area including the indicated position corresponding to Person H can be found as the position at a distance of (b1−a1)−(b1−h1)−((h1−g1)/2) from the left side of the display area in the x-direction.

Moreover, the following is how to find cutout lines for cutting out a unit area including the indicated position corresponding to Person D that has no adjacent indicated position on the left thereof and has the adjacent indicated position on the right thereof. The lateral position of a right-hand cutout line for cutting out the unit area including the indicated position corresponding to Person D can be found as the position at a distance of (b1−a1)−(b1−d1)+((e1−d1)/2) from the left side of the display area in the x-direction. On the other hand, the lateral position of a left-hand cutout line for cutting out the unit area including the indicated position corresponding to Person D can be found as the position at a distance of (b1−a1)−(b1−d1)−((e1−d1)/2) from the left side of the display area in the x-direction.

Programs executed by the conference terminal 2 or the projector 300 can be provided in such a manner that each program is recorded on a computer-readable recording medium, such as a CD-ROM, a flexible disk (FD), a CD-R, a digital versatile disk (DVD), or a universal serial bus (USB) flash drive, in an installable or executable file format, or can be provided or distributed via a network such as the Internet. Furthermore, the programs can be provided in such a manner that each program is built into a ROM or the like in advance.

According to exemplary embodiments of the present invention, it is possible to provide a communication system, a communication apparatus, and a communication method that enable one's intended output.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication system comprising a first communication apparatus and a second communication apparatus that transmits/receives data to/from the first communication apparatus, wherein
the first communication apparatus includes:
an area dividing unit that divides, of an output image which is an image that the first communication apparatus has output and includes at least a shot image obtained by shooting the surroundings of the second communication apparatus, a display area indicating an area where the shot image is displayed into as many unit areas as the number of people captured in the shot image;
a first transmission control unit that performs control of transmitting coordinate information which indicates, of the output image, a unit area corresponding to a position pointed by a user to the second communication apparatus; and
an output control unit that, when the first communication apparatus has received output information including a voice subjected to directivity control according to, of the shot image, an area corresponding to the coordinate information from the second communication apparatus, performs control of outputting the received output information, and the second communication apparatus includes:
an acquiring unit that acquires the shot image;
an identifying unit that, when the second communication apparatus has received the coordinate information from the first communication apparatus, identifies, of the shot image acquired by the acquiring unit, an area corresponding to the received coordinate information based on correspondence information indicating a correspondence relationship between the coordinates of the output image and the coordinates of the shot image;
a directivity control unit that controls the directivity of a microphone array including a plurality of microphones to increase the sensitivity of, of the microphones installed in the second communication apparatus, a microphone corresponding to the area identified by the identifying unit; and
a second transmission control unit that performs control of transmitting output information including at least a voice subjected to directivity control by the directivity control unit to the first communication apparatus.

2. The communication system according to claim 1, wherein
the second communication apparatus further includes a cutting-out unit that cuts out, of the shot image acquired by the acquiring unit, an image of the area identified by the identifying unit as a cutout image, and
the second transmission control unit performs control of transmitting output information including the cutout image cut out by the cutting-out unit and the voice subjected to directivity control by the directivity control unit to the first communication apparatus.

3. The communication system according to claim 1, wherein
the area dividing unit equally divides the display area into as many unit areas as the number of user's operations performed to point at people captured in the display area, thereby obtaining multiple unit areas.

4. The communication system according to claim 1, wherein
the area dividing unit divides the display area into multiple unit areas that correspond one-to-one to multiple positions in the display area indicated by user's operations on the basis of a relative positional relationship between four vertices of the output image and the multiple positions in the display area indicated by the user's operations.

5. A communication apparatus comprising:
an area dividing unit that divides, of an output image which is an image that the communication apparatus has output and includes at least a shot image obtained by shooting the surroundings of another communication apparatus which communicates with the communication apparatus, a display area indicating an area where the shot image is displayed into as many unit areas as the number of people captured in the shot image;
a transmission control unit that performs control of transmitting coordinate information which indicates, of the output image, a unit area corresponding to a position pointed by a user to the other communication apparatus; and
an output control unit that, when the communication apparatus has received output information including a voice subjected to directivity control according to, of the shot image, an area corresponding to the coordinate information from the other communication apparatus, performs control of outputting the received output information.

6. A communication method for a communication system including a first communication apparatus and a second communication apparatus that transmits/receives data to/from the first communication apparatus, the communication method comprising:
dividing, by the first communication apparatus, of an output image which is an image that the first communication apparatus has output and includes at least a shot image obtained by shooting the surroundings of the second communication apparatus, a display area indicating an area where the shot image is displayed into as many unit areas as the number of people captured in the shot image;
performing, by the first communication apparatus, control of transmitting coordinate information which indicates, of the output image, a unit area corresponding to a position pointed by a user to the second communication apparatus;
when having received output information including a voice subjected to directivity control according to, of the shot image, an area corresponding to the coordinate information from the second communication apparatus, performing, by the first communication apparatus, control of outputting the received output information;
acquiring, by the second communication apparatus, the shot image;
when having received the coordinate information from the first communication apparatus, identifying, by the second communication apparatus, of the shot image acquired at the acquiring, an area corresponding to the received coordinate information on the basis of correspondence information indicating a correspondence relationship between the coordinates of the output image and the coordinates of the shot image;
controlling, by the second communication apparatus, the directivity of a microphone array including a plurality of microphones to increase the sensitivity of, of the microphones installed in the second communication apparatus, a microphone corresponding to the area identified at the identifying; and
performing, by the second communication apparatus, control of transmitting output information including at least a voice subjected to directivity control at the controlling to the first communication apparatus.

7. A communication method for a communication apparatus, the communication method comprising:
dividing, of an output image which is an image that the communication apparatus has output and includes at least a shot image obtained by shooting the surroundings of another communication apparatus which communicates with the communication apparatus, a display area indicating an area where the shot image is displayed into as many unit areas as the number of people captured in the shot image;
performing control of transmitting coordinate information which indicates, of the output image, a unit area corresponding to a position pointed by a user to the other communication apparatus; and
when the communication apparatus has received output information including a voice subjected to directivity control according to, of the shot image, an area corresponding to the coordinate information from the other communication apparatus, performing control of outputting the received output information.

* * * * *